United States Patent
Hong et al.

(10) Patent No.: US 8,165,056 B2
(45) Date of Patent: Apr. 24, 2012

(54) METHOD AND APPARATUS FOR PROCESSING A PLURALITY OF NETWORK ADDRESSES IN A MOBILE TERMINAL

(75) Inventors: Yong-Geun Hong, Daejeon (KR); Hyoung-Jun Kim, Daejeon (KR)

(73) Assignee: Electronics and Telecommunications Research Institute, Deajeon (KR)

( * ) Notice: Subject to any disclaimer, the term of this patent is extended or adjusted under 35 U.S.C. 154(b) by 462 days.

(21) Appl. No.: 12/514,471

(22) PCT Filed: Aug. 30, 2007

(86) PCT No.: PCT/KR2007/004173
§ 371 (c)(1), (2), (4) Date: May 12, 2009

(87) PCT Pub. No.: WO2008/069405
PCT Pub. Date: Jun. 12, 2008

(65) Prior Publication Data
US 2010/0039989 A1 Feb. 18, 2010

(30) Foreign Application Priority Data
Dec. 8, 2006 (KR) .................. 10-2006-0125039

(51) Int. Cl.
*H04W 4/00* (2009.01)
(52) U.S. Cl. ........................................ 370/313
(58) Field of Classification Search .................. None
See application file for complete search history.

(56) References Cited

U.S. PATENT DOCUMENTS

| 7,061,887 | B2 | 6/2006 | Fan | |
|---|---|---|---|---|
| 8,078,753 | B2* | 12/2011 | Bachmann et al. | 370/255 |
| 2005/0007995 | A1* | 1/2005 | Inoue et al. | 370/349 |
| 2005/0117546 | A1* | 6/2005 | Lioy et al. | 370/332 |
| 2012/0002653 | A1* | 1/2012 | Hirano et al. | 370/338 |

FOREIGN PATENT DOCUMENTS

| KR | 1020050007196 A | 1/2005 |
|---|---|---|
| KR | 1020050078631 A | 8/2005 |
| KR | 1020060070246 A | 6/2006 |

OTHER PUBLICATIONS

International Search Report; mailed Dec. 6, 2007; PCT/KR2007/004173.

\* cited by examiner

*Primary Examiner* — Anh-Vu Ly
(74) *Attorney, Agent, or Firm* — Ladas & Parry LLP

(57) ABSTRACT

Provided is a method and apparatus for processing a plurality of network addresses in a mobile terminal. The method for processing a plurality of network addresses in the mobile terminal includes: storing combinations of an HoA (home address), a plurality of CoAs (care-of addresses) and a plurality of network interfaces of the mobile terminal, through which the mobile terminal may be connected to a plurality of networks; when the mobile terminal transmits packets to a target node, selecting a network interface combination for connecting the mobile terminal to the target node from among the combinations, and setting a corresponding path; and transmitting the packets through the set path.

5 Claims, 6 Drawing Sheets

FIG. 6

| HoA | CoA | NETWORK INTERFACE NUMBER | SELECTION |
|---|---|---|---|
| HoA1 | CoA1 | NI1 | |
| HoA1 | CoA2 | NI1 | |
| HoA1 | CoA3 | NI2 | |

METHOD AND APPARATUS FOR PROCESSING A PLURALITY OF NETWORK ADDRESSES IN A MOBILE TERMINAL

This application claims the benefit of Korean Patent Application No. 10-2006-0125039, filed on Dec. 8, 2006, in the Korean Intellectual Property Office, the disclosure of which is incorporated herein in its entirety by reference.

TECHNICAL FIELD

The present invention relates to a method and apparatus for processing a plurality of network addresses in a mobile terminal, and more particularly, to a method and apparatus for processing a plurality of network addresses in a mobile terminal using a virtual interface for multiple network interfaces.

BACKGROUND ART

In a next generation network or an all-Internet protocol (IP) network, a number of services and various access technologies are combined or consolidated to provide new services and improve existing services. In addition, the integration of various services and technologies, such as the integration of wired and wireless communication and the integration of broadcasting and communication, is expected for new services.

For the integration of services and technologies, various communication technologies must be integrated. For example, integration of 802.3 Ethernet communication technology with 802.11 wireless local area network (LAN) communication technology, integration of wireless LAN with a code division multiple access (CDMA) technology, or integration of wireless LAN, CDMA technology, and wireless broadband (WiBro) is increasingly required. To apply the various access technologies to a terminal requires the modification of mobility supporting technologies, including a mobile IP that is developed for a mobile terminal having a single network interface using the existing single access technology. As nodes emerge with multiple network interfaces using various access technologies for providing new concept services and seamless network connection services, it becomes difficult to use the mobility supporting technology used in nodes having the existing single network interface.

The existing mobile Internet protocol version 6 (IPv6) guarantees the mobility of the terminal using a single home address (HoA) and a single care-of address (CoA). The HoA is an address that is initially allocated to the mobile terminal and is not changed. The CoA is an address that is used for routing toward an area to which the mobile moves, and is used by an external network. However, the Internet Engineering Task Force (IETF) is developing a study of guaranteeing Internet connectivity, reliability, or load balancing of the terminal using a plurality of CoAs instead of a single CoA.

Accordingly, a new mechanism for processing a plurality of the CoAs in the mobile terminal using a virtual interface for multiple network interfaces is needed.

DISCLOSURE OF INVENTION

Technical Problem

The present invention provides a method and apparatus for processing a plurality of care-of addresses (CoAs) when a mobile terminal employing a virtual interface for multiple network interfaces uses a plurality of network addresses or a mobile Internet protocol version 6 (IPv6).

Technical Solution

According to an aspect of the present invention, there is provided a method of processing a number of network addresses in a mobile terminal, the method including: storing combinations of an HoA (home address), a plurality of CoAs (care-of addresses) and a plurality of network interfaces of the mobile terminal, through which the mobile terminal may be connected to a plurality of networks; when the mobile terminal transmits packets to a target node, selecting a network interface combination for connecting the mobile terminal to the target node from among the combinations, and setting a corresponding path; and transmitting the packets through the set path.

According to another aspect of the present invention, there is provided an apparatus for processing a plurality of network addresses in a mobile terminal, the apparatus including: a storage unit storing combinations of an HoA, a plurality of CoAs and a plurality of network interfaces of the mobile terminal, through which the mobile terminal may be connected to a plurality of networks; an IFS (interface switching) unit storing the combinations in the storage unit, and when the mobile terminal transmits packets to a target node, selecting a combination used to connect the mobile terminal to the target node from among the combinations; and a network connecting unit setting a path for transmitting the packets according to the selected combination.

Advantageous Effects

Accordingly, the mobile terminal can process a plurality of the CoAs without modifying the mobile IPv6 which is assumed to use the existing single network interface and modules associated with networks. In addition, in an environment in which a mobile terminal has multiple network interfaces and multiple network addresses, the mobile terminal according to the present invention can guarantee the mobility of the mobile terminal by using the virtual interface without modifying the modules associated with the existing networks.

DESCRIPTION OF DRAWINGS

The above and other features and advantages of the present invention will become more apparent by describing in detail exemplary embodiments thereof with reference to the attached drawings in which:

FIG. 6 illustrates an exemplified network interface table generated and stored by an interface switching (IFS) unit to manage a plurality of care-of addresses (CoAs)

MODE FOR INVENTION

Exemplary embodiments of the present invention will now be described in detail with reference to the attached drawings.

Figure 1:
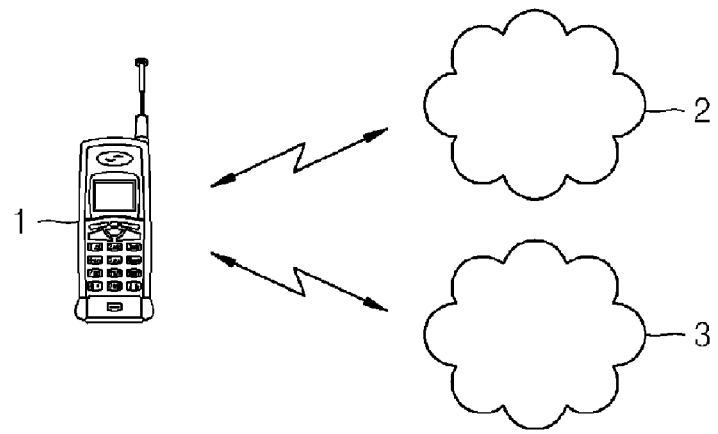
FIG. 1 is a schematic view illustrating a configuration in which a mobile terminal accesses a plurality of networks.

FIG. 1 is a schematic view illustrating a configuration in which a mobile terminal accesses a plurality of networks. Referring to FIG. 1, the mobile terminal 1 accesses networks 2 and 3 through a plurality of built-in network interfaces.

Figure 2:
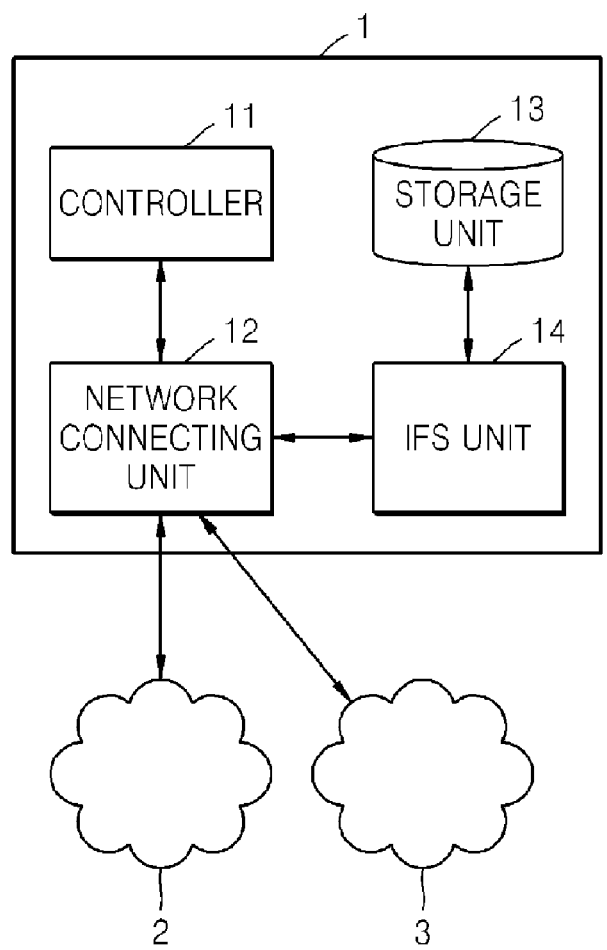
FIG. 2 illustrates the inner structure of a mobile terminal accessing a plurality of networks.

FIG. 2 illustrates the inner structure of the mobile terminal 1 accessing the networks 2 and 3. The mobile terminal 1 includes a controller 11, a network connecting unit 12, a storage unit 13, and an interface switching (IFS) unit 14.

The controller 11 transfers data to be transmitted to the network connecting unit 12 when the data is transmitted to a destination node (not shown) connected to any one of the networks 2 and 3 by an application program that is currently executed.

Figure 3:
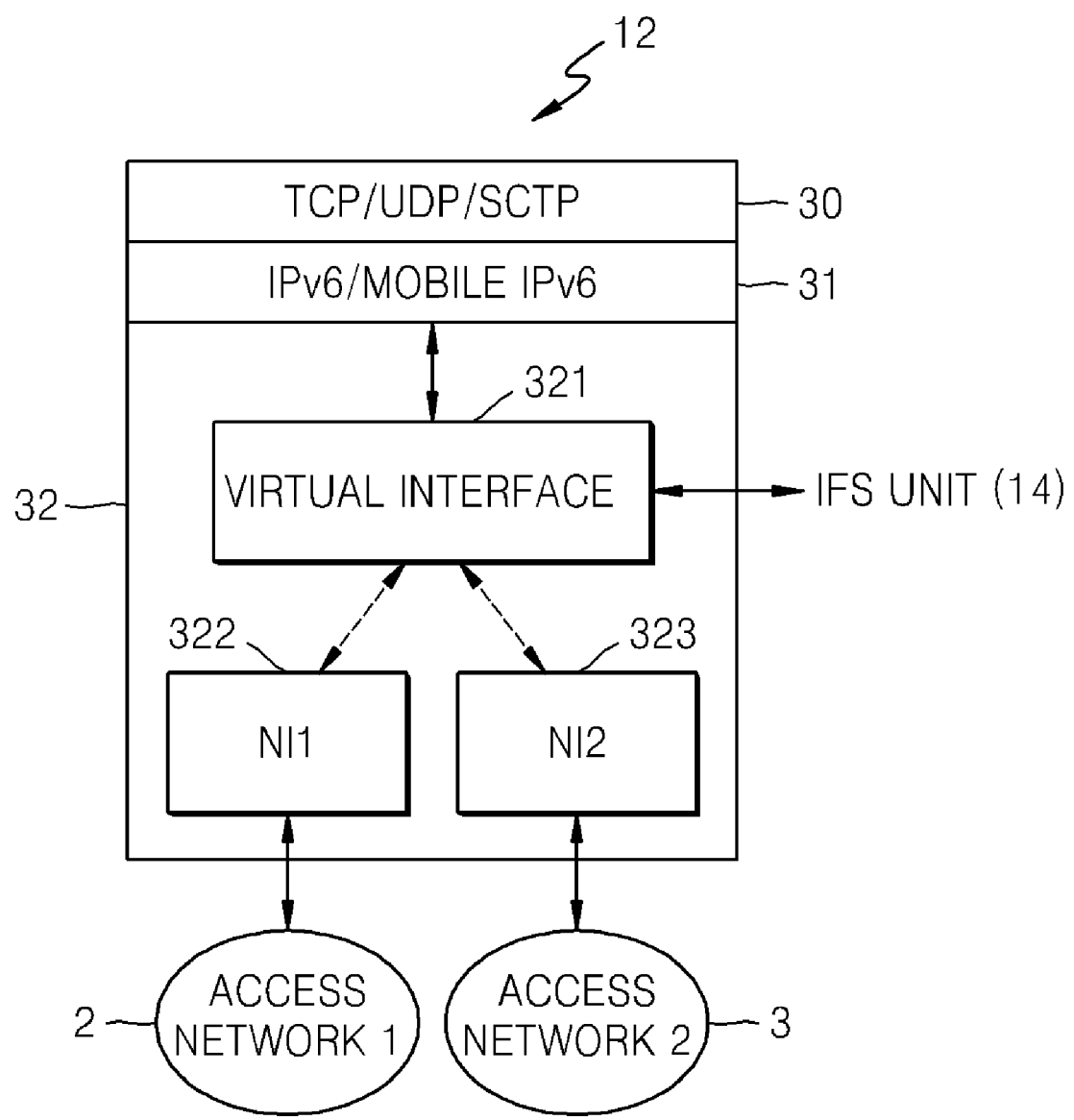
FIG. 3 illustrates a layered structure included in the network connecting unit shown in FIG. 2.

The network connecting unit 12 includes layers as shown in FIG. 3.

Referring to FIG. 3, a reference numeral 30 denotes a transport layer including a transmission control protocol (TCP), a user datagram protocol (UDP), or a stream control transmission protocol (SCTP). A reference numeral 31 denotes a network layer including an Internet protocol version 6 (IPv6) or a mobile IPv6.

A network interface layer 32 includes a virtual interface 321 and a plurality of network interfaces NI1 322 and NI2 323. Movements between the access networks 2 and 3 are performed by the IFS unit 14 connected to the virtual interface 321. The IFS unit 14 is included in the mobile terminal 1 and controls the virtual interface 321.

The mobile terminal 1 includes two or more network interfaces 322 and 323 which are physically connected to two or more access networks 2 and 3. In general, the physical network interfaces 322 and 323 are shown to the upper layers including the network interface layer 32, and changing the physical network interface during communication may cause problems in a communication mechanism based on a single network interface.

However, the physical network interfaces 322 and 323 are not directly connected to the upper layers including the network interface layer 32, but instead a new virtual network interface 321 may be provided to connect to the upper layers 30 and 31. In this case, the existing mobility supporting mechanism including the communication mechanism based on a single network interface and the mobile IPv6 can be used as it is without modification.

The mobile terminal 1 newly generates the virtual interface 321, although it has the physical network interfaces 322 and 323, and registers the virtual interface 321 in the network layer 31 including the IPv6/mobile IPv6 and the upper layer 30.

Figure 4:
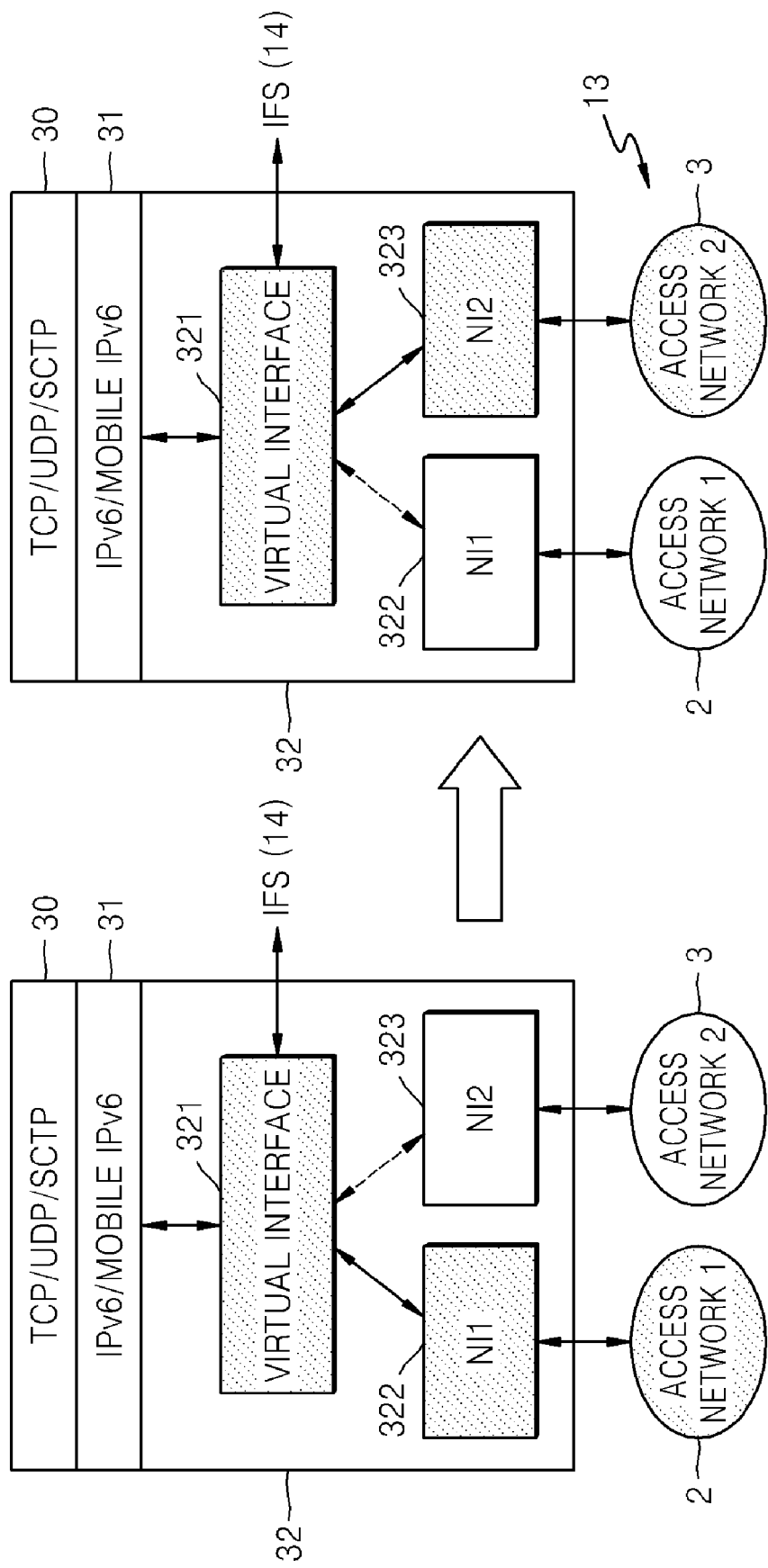
FIG. 4 illustrates a typical process of changing network interfaces when a mobile terminal moves from a first access network to a second access network.

FIG. 4 illustrates a typical process of changing network interfaces when a mobile terminal moves from a first access network 2 to a second access network 3.

Referring to FIG. 4, when the mobile terminal 1 was connected to the first access network 2 through the NI1 322 before movement and is connected to the second access network 3 through the NI2, connection between the virtual interface 321 and the NI1 322 or the NI2 323 is dynamically changed by the IFS unit 14 for controlling the virtual interface 321, and packets are communicated according to the setting changes.

The mobile terminal 1 employing the virtual interface 321 shown in FIG. 3 can use the mobile IPv6 supposed to use the existing single network interface without modification. The existing mobile IPv6 generally guarantees the mobility of the mobile terminal 1 by using a single HoA and a signal CoA at a specific moment. Accordingly, even though the mobile terminal 1 employing the virtual interface 321 uses two or more network interfaces, the mobile terminal 1 uses a single HoA and a single CoA at an instance. However, since using a plurality of CoAs guarantees an improved Internet connection, reliability, or load balancing, the mobile terminal 1 employing the virtual interface 321 needs a mechanism for processing a plurality of CoAs.

Figure 5:
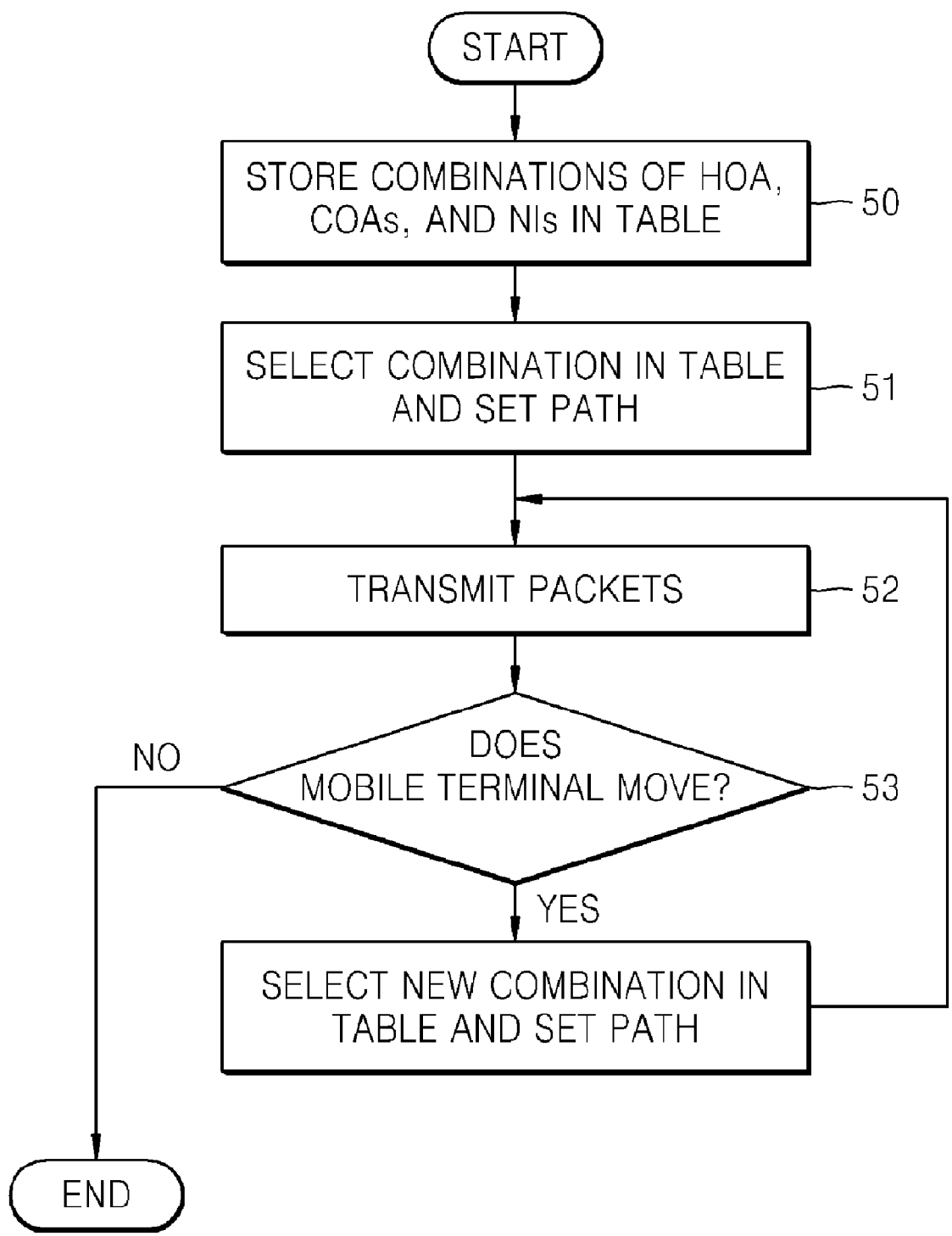
FIG. 5 is a flowchart showing a method of processing a plurality of network addresses in a mobile terminal according to an embodiment of the present invention.

FIG. 5 is a flowchart illustrating a method of processing a plurality of network addresses in the mobile terminal 1 according to an embodiment of the present invention.

First, the IFS unit 14 stores connectable combinations of an HoA, a plurality of CoAs, and the network interfaces in the storage unit 13 (operation 50).

FIG. 6 illustrates an exemplified network interface table generated and stored by the IFS unit 14 to manage a plurality of the CoAs.

The table includes the HoA, the CoAs, network interface numbers, and items for selecting whether to use each interface combination at a specific moment. In general, a single CoA is generated at a network interface connected to an access network. However, when a plurality of the CoAs are used, two or more CoAs may be generated at a single network interface.

Therefore, the table shown in FIG. 6 shows two CoAs CoA1 and CoA2 used for the first network interface NI1, and a single CoA CoA3 used for the second network interface NI2. Since the IFS unit 14 for controlling the virtual interface 321 manages the CoAs generated at the physical network interfaces, the IFS unit 14 generates and renews the table by using the aforementioned information, namely, the HoA, CoAs, network interface numbers, and the items.

When an application program executed by the controller 11 starts data transmission toward a destination node, the data is transferred through the TCP/UDP/SCTP layer 30 and the IPv6/mobile IPv6 layer 31 to the virtual interface 321.

The IFS unit 14 selects a network interface combination that can be connected to a target node from the destination node of the data arriving at the virtual interface 321 in the table shown in FIG. 3, and sets paths according to the selection (operation 51). Network interface combinations are determined according to predetermined policies or rules, and may be changed according to the predetermined policies and the rules after a predetermined time period.

Figure 7:
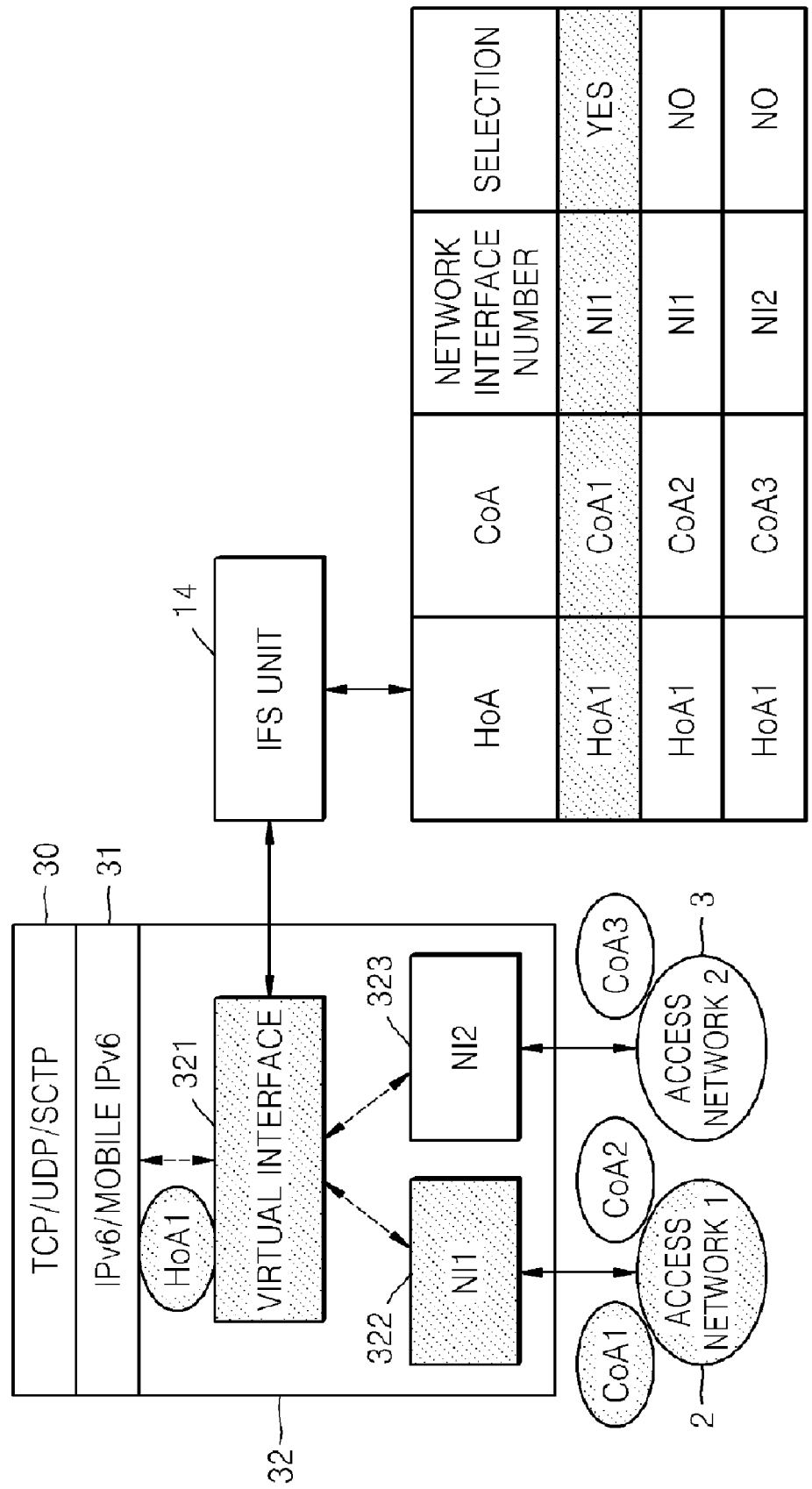
FIG. 7 illustrates a selection of a combination of network interfaces and paths set according to the selection

FIG. 7 illustrates a selection of a network interface combination and a path set according to the selection. Referring to FIG. 7, when the destination node is connected to the first access network 2, the IFS unit 14 selects a CoA1 address according to the aforementioned policies and rules, and selects the first network interface 322. Through the path set according to the selected combination, the IFS unit 14 transmits packets including a binding update packet according to a mobile IPv6 protocol employed while the mobile terminal 1 moves.

The network connecting unit 12 transmits data packets through the set path (operation 52). Conversely, when the destination node transmits the data packets to the first network interface 322, the data packets are transferred from the first network interface 322 to the virtual interface 321 according to the selection of the IFS unit 14, and the virtual interface 321 transfers the data packets to the upper layers 30 and 31.

When the mobile terminal 1 moves and connects to the second access network 3 by using the second network interface 323 (operation 53), the IFS unit 14 selects a combination of (HoA1, CoA3, NI2) and performs packet transmission.

Accordingly, the mobile terminal can process a plurality of the CoAs without modifying the mobile IPv6 which is assumed to use the existing single network interface and modules associated with networks. In addition, in an environment in which a mobile terminal has multiple network interfaces and multiple network addresses, the mobile terminal according to the present invention can guarantee the mobility of the mobile terminal by using the virtual interface without modifying the modules associated with the existing networks.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and detail may be made therein without departing from the spirit and scope of the present invention as defined by the appended claims.

The invention claimed is:

1. A method of processing a plurality of network addresses in a mobile terminal, the method comprising:
    storing combinations of an HoA (home address), a plurality of CoAs (care-of addresses) and a plurality of network interfaces of the mobile terminal, through which the mobile terminal may be connected to a plurality of networks;
    when the mobile terminal transmits packets to a target node, selecting a network interface combination for connecting the mobile terminal to the target node from among the combinations;
    setting a path by a virtual interface on the basis of a CoA and a network interface of the selected combination, wherein the virtual interface is connected to the plurality of network interfaces; and
    transmitting the packets through the set path.

2. The method of claim 1, further comprising:
    when the mobile terminal moves and connects to another network, selecting another network interface combination for connecting to the another network from among the combinations, and setting a corresponding path; and
    transmitting the packets through the set path.

3. An apparatus for processing a plurality of network addresses in a mobile terminal, the apparatus comprising:
    a storage unit storing combinations of an HoA, a plurality of CoAs and a plurality of network interfaces of the mobile terminal, through which the mobile terminal may be connected to a plurality of networks;
    an IFS (interface switching) unit storing the combinations in the storage unit, and when the mobile terminal transmits packets to a target node, selecting a combination used to connect the mobile terminal to the target node from among the combinations; and
    a network connecting unit setting a path for transmitting the packets according to the selected combination, the network connecting unit including
    a virtual interface receiving the combination selected by the IFS unit; and
    the network interfaces connected to the virtual interface, and
    wherein the virtual interface sets the path by connecting a CoA and a network
    interface corresponding to the selected combination.

4. The apparatus of claim 3, wherein the IFS unit selects a combination for connecting the mobile terminal to the target node from among the combinations, while the mobile terminal moves, to allow packets including a binding update packet of the mobile terminal to be transmitted.

5. An apparatus that processes a plurality of network addresses in a mobile terminal, the apparatus comprising:
    a storage unit storing combinations of an HoA, a plurality of CoAs and a plurality of network interfaces of the mobile terminal, through which the mobile terminal may be connected to a plurality of networks;
    an IFS (interface switching) unit that stores the combinations in the storage unit and selects, from among the combinations, a combination used to connect the mobile terminal to the target node;
    a network connecting unit setting a path for transmitting the packets according to the selected combination;
    a virtual interface that receives the combination selected by the IFS unit and sets a path on the basis of a CoA and a network interface of the selected combination; and
    a network layer in communication with the virtual interface, and wherein the network layer is not modified in response to the selected combination.

* * * * *